United States Patent [19]

Maitani

[11] 4,166,680
[45] Sep. 4, 1979

[54] STROBO UNIT FOR CAMERA

[75] Inventor: Yoshihisa Maitani, Hachioji, Japan

[73] Assignee: Olympus Optical Co., Ltd., Tokyo, Japan

[21] Appl. No.: 857,248

[22] Filed: Dec. 5, 1977

[30] Foreign Application Priority Data

Jan. 27, 1977 [JP] Japan .................. 52-9172[U]

[51] Int. Cl.² ............... G03B 15/02; G03B 15/03; G03B 15/05
[52] U.S. Cl. .................... 354/126; 354/33; 354/139; 354/149
[58] Field of Search .............. 354/126, 139, 145, 149, 354/32, 33, 34, 35; 362/3, 11

[56] References Cited

U.S. PATENT DOCUMENTS

| | | | |
|---|---|---|---|
| 3,252,394 | 5/1966 | Jakob et al. | 354/126 |
| 3,768,387 | 10/1973 | Hasegawa | 354/126 X |
| 4,078,240 | 3/1978 | Kaneko et al. | 354/126 X |

FOREIGN PATENT DOCUMENTS

| | | | |
|---|---|---|---|
| 1250733 | 9/1967 | Fed. Rep. of Germany | 354/126 |
| 2729654 | 1/1978 | Fed. Rep. of Germany | 354/139 |
| 1395327 | 3/1965 | France | 354/126 |
| 990743 | 4/1965 | United Kingdom | 362/3 |

Primary Examiner—L. T. Hix
Assistant Examiner—Thomas H. Tarcza
Attorney, Agent, or Firm—Lerner, David, Littenberg & Samuel

[57] ABSTRACT

A strobo unit is disclosed for use in association with a camera provided with a changeover switch operating between an automatic exposure mode and a flashlight mode and normally placed in the automatic exposure mode, and with an accessory shoe connected with the X contacts internally housed within the camera, the switch and the shoe being located on adjacent exterior surfaces of the camera. The strobo unit comprises a mounting baseplate connected with the strobo unit in a manner to permit an angular movement therebetween and having a fixture which is adapted to engage the accessory shoe, a normally closed power switch mounted on an outer wall surface of the strobo unit which is adapted to engage the mounting baseplate, and a detent for releasably securing the strobo unit in one of three positions when it is mounted on the camera by engaging the fixture of the baseplate with the accessory shoe, said three positions including a first position in which the exterior surface portion of the strobo unit on which the power switch is mounted bears against the mounting baseplate, a second position in which another exterior surface portion of the strobo unit bears against an exterior surface portion of the camera on which the changeover switch is mounted as the strobo unit is angularly moved from the first position, and a third position located intermediate the first and the second position. When the strobo unit is located in its first position, the changeover switch is maintained in the automatic exposure mode while the power switch is opened as a result of the engagement of the mounting baseplate therewith, thereby enabling an automatic exposure mode of photographing in which a strobo unit is not used. In the second position of the strobo unit, it operates the changeover switch to switch it to the flashlight mode, and the closed power switch enables a flashlight mode for photographing. In the third position of the strobo unit, the changeover switch is again thrown to the automatic exposure mode, and the closed power switch enables an automatic exposure mode of photographing in which a strobo unit is used. In the first position, the casing of the strobo unit forms a single rectangular assembly together with the camera and the mounting baseplate to provide a compact construction for convenience in the portable use.

6 Claims, 6 Drawing Figures

STROBO UNIT FOR CAMERA

BACKGROUND OF THE INVENTION

The invention relates to a strobe unit for cameras.

A strobo unit for cameras is adapted to be mounted on an accessory shoe which is located at a given position along the exterior of the camera, thereby allowing it to be ready for an illumination by merely turning on a power switch. However, it will be appreciated that the mere mounting of the strobo unit on the camera cannot provide an external indication of whether or not the flashlight operation is possible unless a special indicator lamp or the like is provided. If an indicator lamp is provided, a risk is still involved of triggering a shutter release at an undue time. In addition, the inconvenience of portable use of such camera will be appreciated if one considers the physical projection of the strobo unit which is mounted on the camera. In view of these considerations, it will be appreciated that it will be highly desirable from the standpoint of portable use that both the camera and the strobo unit be constructed such that they can be located with respect to each other and can be integrally assembled together when not in use.

On the other hand, a camera capable of both an automatic exposure mode and a flashlight mode of photographing is provided with a changeover switch which switches between these modes, and the switch must be thrown to the flashlight mode whenever it is desired to take a picture under the flashlight illumination. Thus, it will be seen to be highly advantageous if the strobo unit can be constructed such that its movement relative to the camera between the conditions of use and non-use can be utilized to cause a switching to the flashlight mode.

SUMMARY OF THE INVENTION

It is an object of the invention to provide a strobo unit for a camera in which the strobo unit is constructed to be movable between a use and a non-use position and wherein it is configured to provide a compact overall configuration together with the camera when not in use to improve the convenience of portable use while it may be angularly moved when taking a picture under the flashlight illumination, with the movement being utilized to turn on the power source of the strobo unit and to switch the camera circuit to the flashlight mode.

In accordance with the invention, when the strobo unit is mounted on the camera in its non-use position, the overall configuration of the camera and the strobo unit represents an integral, compact form, thus improving the convenience of portable use. When the strobe unit is angularly moved to its use position, the movement closes the power switch, thus immediately and automatically enabling the strobo unit. In addition, the movement is also utilized to switch the camera circuit to the flashlight mode, thus affording a great practical utility.

DESCRIPTION OF PREFERRED EMBODIMENT

Figure 1A:
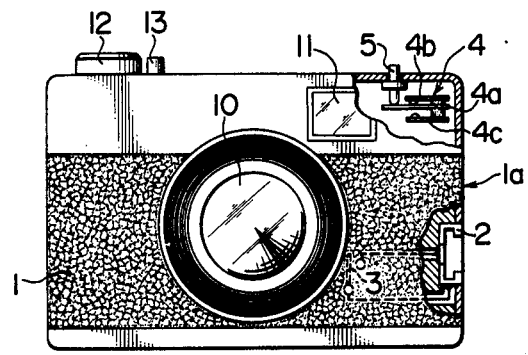
FIGS. 1(A) and (B) are front views of a camera and a strobo unit mounted thereon which is constructed in accordance with one embodiment of the invention.

Referring to FIG. 1(A), there is shown a camera 1 having an accessory shoe 2 embedded in the right-hand sidewall 1a thereof. The accessory shoe 2 includes an electrical contact which is connected with an X contact 3, and is formed by a hardware member commonly referred to as a hot shoe. The camera 1 also includes a changeover switch 4 which switches between an automatic exposure mode and a flashlight mode. The switch 4 is disposed in an upper, right-hand corner of the camera 1, and includes a movable contact 4a which may be thrown from one of the stationary contacts, 4b, to the other stationary contact 4c by means of a switching member 5. Thereupon, an exposure control circuit 6 contained within the camera (see FIG. 4) is switched to a flashlight mode.

Figure 4:
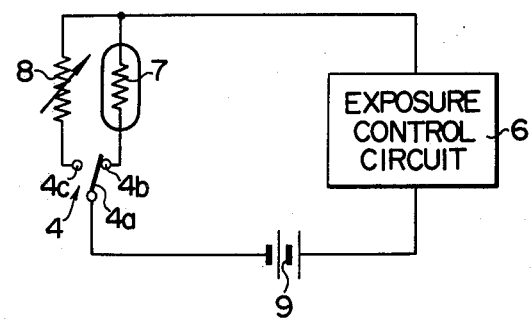
FIG. 4 is a circuit diagram of one exemplary electrical circuit contained within the camera.

The switching member 5 comprises an electrically insulating material and has its lower end disposed in abutment against the movable contact 4a, while its upper end is caused to project through an opening in the camera 1 above the top surface thereof by the resilience of the movable contact 4a. The resilience of the movable contact 4a normally maintains it in contact with the stationary contact 4b, thus maintaining the exposure control circuit 6 in its automatic exposure mode. Referring to FIG. 4, it will be seen that when the changeover switch 4 assumes its normal position in which the movable contact 4a is thrown to the stationary contact 4b, a photometric, light receiving element 7 is connected in circuit with the exposure control circuit 6, thus establishing an automatic exposure mode of the camera 1. However, when the switching member 5 is depressed to throw the movable contact 4a into contact with the other stationary contact 4c, a variable resistor 8 interlocked with a range adjusting ring, not shown, is connected with the exposure control circuit 6 to establish a flashlight mode of the camera 1. Numeral 9 in FIG. 4 shows a power source.

In other respects, the arrangement of the camera 1 is conventional as shown in FIG. 1. Specifically, a taking lens 10 and viewfinder objective window 11 are disposed in the front panel of the camera, while a film winding knob 12 and a shutter release button 13 are disposed on the left-hand top portion of the camera.

Figure 1B:
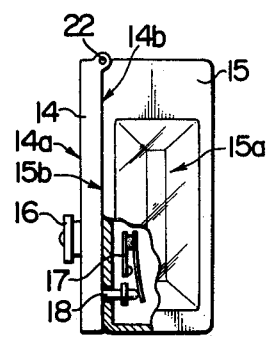

Referring to FIG. 1(B), a strobo unit 15 is elongated in configuration and is attached to a mounting plate 14 in an angularly movable manner. The baseplate 14 is a relatively thick plate of generally similar size as the outer sidewall 1a of the camera, and its left-hand sidewall provides a mounting surface 14a which may be attached to the right-hand sidewall 1a of the camera. A fixture 16 which fits in the accessory shoe 2 of the camera is secured to the mounting surface 14a at a corresponding position, and its electrical contact is connected with a trigger circuit contained within the strobo unit 15 in a manner well known in the art. The opposite side of the baseplate 14 provides an abutment surface 14b against which the strobo unit 15 may abut.

The strobo unit 15 has a casing which is configured as an elongated box. When in use, the unit is positioned on top of the camera such that its front illumination window 15a faces forwardly (see FIG. 2). The opposite sides of the strobo unit 15 are of a size which is substantially coextensive with the outer sidewall 1a of the camera, with one of the sides providing an abutment surface 15b against the mounting surface 14b of the baseplate 14. Thus, the abutment surface 15b is substantially coextensive with the mounting surface 14a. When not in use, the strobo unit 15 assumes a position at 15C shown in FIG. 2, forming a rectangular assembly together with the camera 1 and the baseplate 14.

Figure 5:
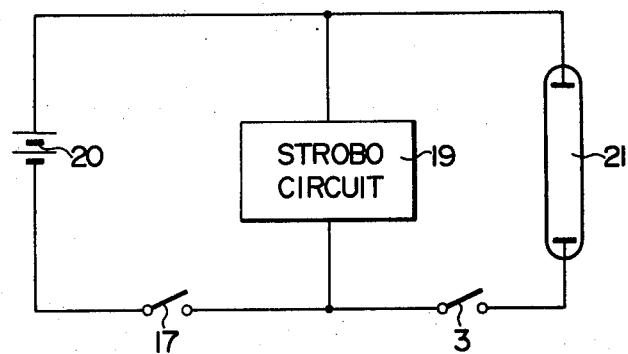
FIG. 5 is a circuit diagram of one exemplary electrical circuit of the strobo unit.

The strobo unit internally houses an illumination circuit including a flash discharge tube and a power switch 17, which comprises a normally closed switch and is adapted to be actuated by an operating member 18. The operating member 18 bears against the movable contact of a switch 17, which contact is formed of a resilient material to urge the operating member 18 to project out of the abutment surface 15b. When the member 18 is depressed into the casing of the strobo unit, the switch 17 is opened. As shown in FIG. 5, the power switch 17 is operative to connect the illumination circuit 19 with a power source 20. As is well known, the illumination circuit 19 is connected through the X contacts 3 with a flash discharge tube 21, which is triggered upon closure of the X contacts 3.

Figure 3:
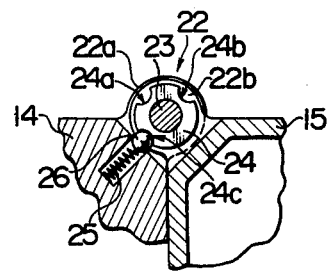
FIG. 3 is a fragmentary cross section showing a hinge and a click stop mechanism.

Returning to FIG. 1(B), the strobo unit 15 is mounted to be angularly movable relative to the baseplate 14, by using a hinge 22. Specifically, as shown in FIG. 3, a hinge plate 22a integrally projects from the upper, right shoulder of the baseplate 14, as viewed in FIG. 1(B), and carries a hinge pin 23 passing therethrough, the hinge pin also passing through another hinge plate 22b secured to the upper, left shoulder, as viewed in FIG. 1(B), of the casing of the strobo unit 15, the parts 22a, 22b and 23 forming together the hinge 22 which mounts the strobo unit 15 on the baseplate 14 in an angularly movable manner.

The strobo unit 15 also includes a click stop mechanism which is associated with the hinge 22 for constraining the strobo unit 15 in a selected angular position. Specifically, the click stop mechanism comprises a disc 24 mounted on the hinge pin 23 and secured to the hinge plate 22b. The disc 24 is formed with a plurality of recesses 24a, 24b and 24c. The click stop mechanism also includes a ball 26 which is urged by a spring 25, nestingly received in the baseplate 14, toward the disc 24 so that it may engage one of the recesses. When the ball 26 engages the recess 24c, the strobo unit 15 is in an angular position 15c which it assumes when not in use, thus forming a rectangular assembly together with the camera. When the strobo unit 15 is rotated 90° counter-clockwise, it may be maintained in the position 15B as a result of the engagement between the ball 26 and the recess 24a. Similarly, the strobo unit may be maintained in the position 15A by a further rotation thereof through 90° or 180° from the initial position, by the engagement between the ball 26 and the recess 24b. It will be appreciated that the click stop mechanism may be replaced by frictional means which provides a frictional constraint between the both hinge plates.

When not in use, the strobo unit 15 is rotated clockwise to the position 15C so that the abutting surface 15b bears against the abutting surface 14b of the mounting base-plate 14, as shown in FIG. 1(B), and it is held in this position by the engagement between the ball 26 and the recess 24c of the click stop mechanism. At this time, the operating member 18 projecting out of the abutting surface 15b of the strobo unit 15 is driven into the casing thereof as it bears against the abutting surface 14b, whereby the power switch 17 of the strobo unit 15 is opened to make it inoperative. By engaging the fixture 16 with the hot shoe 2 of the camera 1, the strobo unit 15 may be mounted on the outer sidewall 1c of the camera, as shown by the phantom line 15C. Since the mounting surface 14a of the baseplate 14, the abutting surface 14b and the abutting surface 15b of the strobo unit 15 are of a similar size, the entire assembly represents an integral rectangular assembly free from any projection, affording convenience for portable use of the camera 1 with the strobo unit 15 attached thereto.

Figure 2:
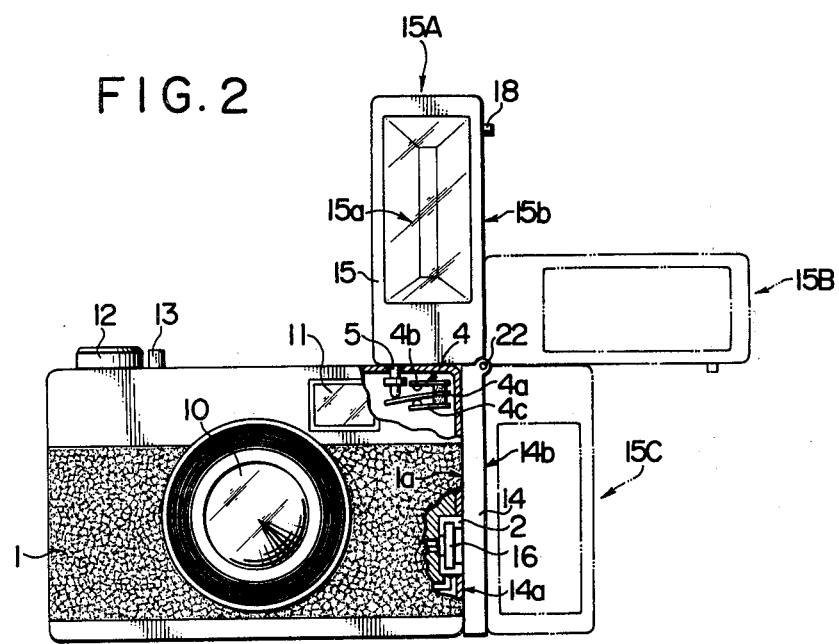
FIG. 2 is a front view of the combined camera and strobo unit, illustrating the operative position of the latter.

When it is desired to use the strobo unit 15 for flashlight photography, it may be rotated counter-clockwise through an angle of 180° from the position 15C to the position 15A until it rests on the top of the camera, as shown in FIG. 2. In the position 15A, the ball 26 engages the recess 24b of the click stop mechansim, thus maintaining the strobo unit 15 in such position. During such rotation through 180°, the abutting surface 15b of the strobo unit 15 moves away from the abutting surface 14b of the baseplate 14, so that the operating member 18 becomes free to project outwardly to close the power switch 17 (see FIG. 1(B)), making it operative. When the strobo unit 15 has been rotated through 180° to stand on top of the camera 1, switching member 5 is urged by the bottom wall of the unit 15 to be depressed into the camera 1, whereby the changeover switch 4 is switched to move the movable contact 4a from the stationary contact 4b to the stationary contact 4c, thus automatically establishing a flashlight mode of the exposure control circuit 6 (see FIG. 4) contained within the camera. Consequently, by adjusting the camera to a distance setting appropriate for the object being photographed, the shutter may be released to produce a flashlight illumination from the strobo unit 15, achieving a flashlight photography.

When it is desired to flash the strobo unit 15 while maintaining the camera 1 in its automatic exposure mode, the unit 15 may be moved to the position 15B which is angularly displaced 90° counter-clockwise from the stationary position 15C. The unit 15 is maintained in this position by the engagement of the ball 26 with the recess 24a of the click stop mechanism. Since the abutting surface 15b is removed from the abutting surface 14b of the baseplate 14, the power switch 17 is closed to permit the strobo unit 15 to be used. However, the changeover switch 4 of the camera 1 is not switched, and hence the camera is in its automatic exposure mode. A shutter release under this condition permits a photographing operation with flashlight illumination, by a mere operation of the strobo unit 15, or an ordinary synchronized photographing operation.

What is claimed is:

1. A strobo unit for use with a camera, said camera having mounted on its adjacent outer walls a changeover switch adapted to switch between an automatic exposure mode and a flashlight mode of photographing and normally establishing the automatic exposure mode, and an accessory receiver electrically connected with an X contact internally housed with the camera; the strobo unit comprising a flash section and a mounting baseplate, said baseplate carrying a fixture adapted to be engaged with the accessory receiver for mounting the strobo unit on the camera, said baseplate connected with the flash section for relative rotation therebetween, a normally closed power switch mounted in said flash section for supplying power to said flash section and which is adapted to be opened by bearing against the mounting baseplate, detent means operative to lock the flash section in one of at least two positions relative to said camera and said baseplate including a first position in which the power switch bears against the baseplate to open said power switch and a second position in which the flash section is angularly displaced from the first position and said baseplate so that an outer wall of said flash section bears against the outer wall of the camera in which the changeover switch is mounted, the flash section being disabled in its first position so as to enable an automatic exposure mode of photographing as a result of the changeover switch being maintained in the automatic exposure mode and the power switch being opened by abutment of the flash section against the baseplate, the flash section being enabled in its second position to permit a flashlight mode of photographing as a result of the changeover switch being operated to the other position representing the flashlight mode and the power switch being maintained in its normally closed position.

2. A strobo unit according to claim 1 in which the strobo unit includes a casing which is configured to form a substantially integral rectangular assembly together with the camera and the mounting baseplate when it is in its first position.

3. A strobo unit according to claim 1 in which the strobo unit may be locked by the detent means at a third position intermediate the first and the second position, the power switch being maintained closed and the changeover switch being maintained in the position representing the automatic exposure mode when the strobo unit is in its third position, thereby enabling an automatic exposure mode of photographing with an optional use of the strobo unit.

4. A strobo unit according to claim 1 in which the detent means comprises a click stop mechanism.

5. A strobo unit according to claim 1 in which the detent means comprises means which provides a frictional constraint between the connecting parts.

6. A strobo unit for a camera having a mounting shoe and first internal camera switch means movable between an automatic exposure position and a flashlight position;

said strobo unit having a mounting plate and a flash unit swingably mounted on said mounting plate;

said plate having means for engaging said shoe to releasably secure said strobo unit to said camera;

said flash unit including a power switch operable from a closed position to an open position by engagement with said mounting plate;

said flash unit being adapted to swing between a first position engaging said mounting plate and said power switch and a second position engaging said first switch means for switching from said automatic exposure position to said flashlight position.

* * * * *